United States Patent Office 2,980,658
Patented Apr. 18, 1961

2,980,658

COPOLYMER OF AN ALKYL METHACRYLATE AND AN ALPHA-ACYLOXYSTYRENE, AND METHOD FOR PREPARING SAME

George E. Ham, Easton, Pa., assignor to J. T. Baker Chemical Co., Phillipsburg, N.J., a corporation of New Jersey No Drawing. Filed May 14, 1956, Ser. No. 584,482

4 Claims. (Cl. 260—86.1)

My invention relates to polymerization products of alpha-acyloxystyrenes and alkyl methacrylates.

Polymerization products useful as plastics in the manufacture of various articles or protective coatings desirably possess a combination of properties such as strength, toughness, heat resistance, hardness and mar resistance. Polymers of methyl methacrylate while having certain useful properties are restricted in their application because of limited hardness, and limited heat and mar resistance. Previous attempts to improve scratch or mar resistance, e.g., by the addition of cross linking agents, have resulted in undesirable increased brittleness and other bad properties. It has also resulted in products which are difficult to fabricate either by compression or injection molding.

I have found that copolymers of alpha-acetoxystyrene and methyl methacrylate possess a particularly advantageous and surprising combination of properties which make them particularly useful as plastics for the production of articles by molding, for example.

The copolymers of my invention are heat resistant and have appreciably higher softening points than polymers of methyl methacrylate. Thus, they have improved resistance to deformation at elevated temperatures. The copolymers are clear, colorless and hard and have good impact strength. They are appreciably harder than methyl methacrylate polymers. Surprisingly, even though they are hard, the compositions possess excellent resilience and are not brittle. Thus, they have good mar resistance, a particularly desirable property. Few materials show the property of improved resilience with increasing hardness. Also, the copolymers do not have the undesirable property of "elastic memory" possessed by the homologous methacrylates. The copolymers are useful, for example, for the production of plastic articles such as molded articles and castings of sheets, rods, tubes and massive pieces. The copolymers are generally useful for the same purposes as, and can be made into useful articles in a manner similar to, the corresponding methacrylate homopolymer.

The phenomenon of increased heat resistance and hardness is also characteristic generally of copolymers of alpha-acyloxystyrenes and alkyl methacrylates as compared to the corresponding alkyl methacrylate homopolymer and these products possess the properties described above.

The compositions of my invention comprise polymerization products of alpha-acyloxystyrenes in which the acyl group contains not more than 6 carbon atoms and alkyl methacrylates in which the alkyl group contains not more than 4 carbon atoms. The compositions comprise about 1 to 55 weight percent of alpha-acyloxystyrene copolymerized with about 45 to 99 weight percent of alkyl methacrylate. Expressed in another way, the compositions comprise alkyl methacrylate copolymerized with about 1 to 122 weight percent of alpha-acyloxystyrene based on the alkyl methacrylate. Particularly advantageous compositions comprise about 10 to 45 weight percent of alpha-acyloxystyrene copolymerized with about 55 to 90 weight percent of alkyl methacrylate. Particularly preferred compositions comprise about 15 to 40 weight percent of alpha-acyloxystyrene copolymerized with about 60 to 85 weight percent of alkyl methacrylate. By the term alpha-acyloxystyrene, I mean an alpha-acyloxystyrene or mixtures of alpha-acyloxystyrenes and by the term alkyl methacrylate, I mean an alkyl methacrylate or mixtures of alkyl methacrylates. Useful products have an intrinsic viscosity as measured in dioxane at 25° C. of at least about 0.2. Preferably, the compositions have an intrinsic viscosity of at least about 0.4. As the viscosity increases, the enhanced properties of the product appear to approach asymptotic limits.

The alkyl methacrylates useful in my invention are those in which the alkyl group contains not more than 4 carbon atoms, e.g. methyl, ethyl, n-propyl, iso-propyl, n-butyl, iso-butyl, t-butyl and sec-butyl methacrylates.

The useful alpha-acyloxystyrenes include those in which the acyl group contains not more than 6 carbon atoms, e.g. alpha-formoxystyrene, alpha-acetoxystyrene, alpha-propionoxystyrene, alpha-butyroxystyrene, alpha-valeroxystyrene and alpha-caprooxystyrene. The compounds have the formula

wherein R' is a phenyl radical and the group R—CO— can be formyl, acetyl, propionyl, butyryl, isobutyryl, valeryl or caproyl. Straight or branched chain groups are useful. The compounds can be prepared by the reaction of acetophenone with the isopropenyl ester of the acid containing the desired acyl group, e.g. isopropenyl acetate, isopropenyl propionate, etc., in the presence of sulfuric or sulfoacetic acid. Also, alpha-acetoxystyrene can be prepared from the reaction of acetophenone with ketene in the presence of sulfuric acid or by the reaction of styrenebromohydrin with acetyl chloride to give alpha-acetoxy-β-bromoethylbenzene which is then distilled with quinoline to give the alpha-acetoxystyrene.

The products of my invention can contain, of course, various conventional additives such as dyes, pigments, lubricants, plasticizers and modifying agents. Other materials such as, for example, acrylonitrile, methacrylonitrile, fumaronitrile, styrene, acrylic esters, e.g. methyl acrylate, and other alkyl methacrylates can be used and present in the products of my invention.

Part of the alpha-cyloxystyrene content of my products described above can be replaced with an alpha-alkylstyrene, or mixtures of alpha-alkylstyrenes, to produce advantageous polymerization products of alpha-acyloxystyrene, alpha-alkylstyrene and alkyl methacrylate having the properties of the products described above. The alpha-acyloxystyrene and alpha-alkylstyrene can be used in any proportion within the total amount of substituted styrene in the product, i.e. 1 to 55 percent. Particularly advantageous mixtures are those in which about 25 to 75 percent of the alpha-acyloxystyrene content is replaced with alpha-alkylstyrene. Copolymers of alpha-alkylstyrenes and alkyl methacrylates are disclosed in my copending applications Serial No. 560,860, filed January 23, 1956, now abandoned, and Serial No. 584,481, filed May 14, 1956, now abandoned.

The useful alpha-alkylstyrenes include those in which the alkyl group contains not more than 6 carbon atoms, e.g. styrene substituted in the alpha position with a methyl, ethyl, propyl, butyl, amyl or hexyl group. Straight or branched chained groups are useful. The compounds have the formula

wherein R' is a phenyl radical and R is an alkyl group of 1 to 6 carbon atoms. These compounds can be prepared, for example, by the catalytic dehydrogenation of the corresponding isoalkylbenzene in the presence of steam or by the dehydration of the corresponding carbinol by the use of a dehydrating agent such as sodium bisulfate, oxalic acid or anhydrous potassium hydroxide. The carbinols are prepared by the reaction of methyl magnesium bromide with an alkylphenyl ketone or by the reaction of acetophenone with an alkyl magnesium bromide.

The compositions of my invention can be prepared by the polymerization of alpha-acyloxystyrene monomer, or an admixture with alpha-alkylstyrene monomer, and alkyl methacrylate monomer by mass, suspension, emulsion or solution polymerization procedures.

In the polymerization the ingredients in the desired proportions are reacted at a temperature of about 70 to 160° C. for varying periods of time in the presence of a polymerization catalyst. Catalysts suitable for preparing my copolymers are free radical producing catalysts, for example, organic peroxides, persulfates, ozonides, metal alkyls, diazonium salts, diazotates, hydrazines and amine oxides. Among the organic peroxides, benzoyl peroxide, tertiary-butyl hydroperoxide and di-tertiary-butyl peroxide are particularly useful. The catalyst is used in a concentration of about 0.01 to 0.8 weight percent based on the total monomers.

In general, it is desirable to convert the monomers charged as completely as possible to copolymer. Under these circumstances the overall composition of the copolymer obtained will be substantially similar to that of the mixture of monomers charged. At lower conversions, however, the composition of the copolymer can differ significantly from that of the mixture of monomers charged. This will depend upon the degree of conversion, the reactivities of the individual monomers and the ratio of the monomers in the charge. These factors are easily determinable by simple experimentation.

Should any unreacted monomer remain in the polymerization product, it can be extracted with a solvent, for example, methanol in admixture with benzene or dioxane.

While the reaction can be carried out in a single heating at a substantially constant temperature, preferably the reaction is carried out by increasing the temperature in increments, i.e., in a heating cycle involving a gradual elevation of temperature. The use of the cycle is advantageous in that lower catalyst concentrations can be used, increased conversions are obtained, polymerization time is reduced, bubble formation is reduced, depolymerization at high temperature is avoided and a more uniform product is obtained.

In preparing the polymers of emulsion polymerization procedures, the ingredients are heated together in the presence of an emulsifier, e.g., Aerosol OT (dioctyl sodium sulfosuccinate), and a suitable catalyst. An advantageous catalyst is potassium persulfate. Also, the use of redox polymerization methods may be advantageous.

The compositions of my invention and their preparation will be further illustrated by reference to the following examples.

Example I

A copolymer of alpha-acetoxystyrene and methyl methacrylate was prepared by a mass polymerization procedure using 0.1 percent by weight of benzoyl peroxide as catalyst, 25 weight percent of alpha-acetoxystyrene monomer and 75 weight percent of methyl methacrylate monomer. The monomers and catalyst were heated at 90° C. for 6 days. A product was recovered containing 23.4 percent by alpha-acetoxystyrene and the balance methyl methacrylate. The conversion was 83 percent.

The increased heat resistance of the product obtained is evident in that it softened at 171° C. as compared to a softening point of only 142° C. for "Plexiglas V-100," a commercially available polymethyl methacrylate. The softening point was determined on a Parr melting point bar by sprinkling the powdered polymer on a heated block and noting the temperature at which the material tends to adhere to the block.

The product had an intrinsic viscosity as measured in dioxane at 25° C. of 0.75.

By the term intrinsic viscosity as used herein, I mean the value $[\eta]$ obtained by the experimental determination of specific viscosity $\eta_{sp}$ and calculated from the following equation $$[\eta] = \left[\frac{\eta_{sp}}{C}\right]_{C \to 0}$$

where C is concentration in grams of polymer per 100 mls. of solution. Experimentally, specific viscosities were determined at 0.25, 0.50, and 1.0 grams of copolymer per 100 mls. of solution. Extrapolation of a smooth curve drawn through points plotted as $$\frac{\eta_{sp}}{C} \text{ vs. } C$$

approaches 0 gave $[\eta]$ as the value of the intercept on the Y axis. In every case studied by me in this copolymer system the three values of $$\frac{\eta_{sp}}{C}$$

determined lay on a straight line and the value of $[\eta]$ was determined by the extrapolation of this straight line to zero concentration. Dioxane was used as a solvent in all cases for these copolymers. See also page 30 of Vinyl and Related Polymers by C. E. Schildknecht, John Wiley and Sons, Inc., New York, 1952.

Example II

The copolymer of methyl methacrylate and alpha-acetoxystyrene of Example I was molded into 1⅛ inch disks and the product evaluated. The results are tabulated below as well as comparative data on Plexiglas V-100, a commercially available polymethyl methacrylate and Styron 700, a commercially available polystyrene.

| Product | Rockwell Hardness [1] | Resistance to Penetration [2] | Disk Distortion Temp., ° C. [3] |
|---|---|---|---|
| Poly MeM | M-92 | 72 | 102.5 |
| Polystyrene | M-81 | | 112.5 |
| MeM/α-AS | M-111 | 90 | 150 |

[1] A.S.T.M. D785-51A procedure.
[2] The value obtained by measuring the depth of penetration on application of the load in procedure (2).
[3] The values were obtained by exposing ⅛" x 1⅛" diameter molded dishes at the test temperature for 5 minutes. The temperature at which the sharp edges started to distort was recorded.

The results clearly indicate the advantageous and surprising properties of increased hardness, resilience and heat resistance of the copolymers. The products are initially harder than the commercially available methyl methacrylate polymer and the commercially available polystyrene. Surprisingly, however, the copolymers possessed excellent resilience. This surprising property of the copolymers is particularly advantageous in the production of molded articles having good mar resistance.

I claim:
1. Polymerization products consisting of 55–90 parts by weight of an alkyl methacrylate in which the alkyl group is from one to four carbon atoms and 10–45 parts by weight of an alpha-acyloxystyrene having the formula

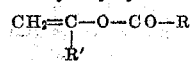

wherein R' is a phenyl radical and RCO— is a radical of the group consisting of formyl, acetyl, propionyl, butyryl, isobutyryl, valeryl and caproyl radicals, said polymer having an intrinsic viscosity of at least 0.2 when measured in dioxane at 25° C.

2. Polymerization products consisting of 60–85 parts by weight of an alkyl methacrylate in which the alkyl group is from one to four carbon atoms and 15–40 parts by weight of an alpha-acyloxystyrene having the formula

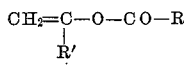

wherein R' is a phenyl radical and RCO— is a radical of the group consisting of formyl, acetyl, propionyl, butyryl, isobutyryl, valeryl and caproyl radicals, and polymer having an intrinsic viscosity of at least 0.2 when measured in dioxane at 25° C.

3. Polymerization products consisting of 55–90 parts by weight of methyl methacrylate and 10–45 parts by weight of alpha-acetoxystyrene, said polymer having an intrinsic viscosity of at least 0.2 when measured in dioxane at 25° C.

4. A method of preparing polymerization products consisting of methyl methacrylate and alpha-acetoxystyrene having an intrinsic viscosity of at least 0.2 when measured in dioxane at 25° C. which comprises heating from 55–90 parts by weight of methyl methacrylate with 10–45 parts by weight of alpha-acetoxystyrene at a temperature of about 70° to 160° C. while increasing the temperature in increments and in the presence of 0.01–0.8 part by weight of a free radical producing polymerization catalyst.

References Cited in the file of this patent
UNITED STATES PATENTS

| | | |
|---|---|---|
| 2,656,334 | D'Alelio | Oct. 20, 1953 |
| 2,701,242 | Erchak et al. | Feb. 1, 1955 |
| 2,743,261 | Coover | Apr. 24, 1956 |
| 2,851,446 | Wesp et al. | Sept. 9, 1958 |